United States Patent [19]

Brookey et al.

[11] Patent Number: 6,156,708
[45] Date of Patent: Dec. 5, 2000

[54] APHRON-CONTAINING OIL BASE FLUIDS AND METHOD OF DRILLING A WELL THEREWITH

[75] Inventors: Tommy F. Brookey, Edmond, Okla.; Jack C. Cowan, Lafayette, La.

[73] Assignee: Actisystems, Inc., Edmond, Okla.

[21] Appl. No.: 09/246,935

[22] Filed: Feb. 9, 1999

Related U.S. Application Data

[63] Continuation-in-part of application No. 08/800,727, Feb. 13, 1997, Pat. No. 5,881,826, and a continuation of application No. PCT/US98/02566, Feb. 10, 1998.

[51] Int. Cl.[7] .............................. C09K 7/08; E21B 43/00; E21B 7/18
[52] U.S. Cl. ............................ 507/102; 507/202; 175/72; 166/309
[58] Field of Search .................................... 507/102, 202; 175/72; 166/309

[56] References Cited

U.S. PATENT DOCUMENTS 5,916,849  6/1999  House ...................................... 507/110
5,977,030  11/1999  House ...................................... 507/110

OTHER PUBLICATIONS

Roy et al., Apilit Abstract 94: 5466, Abstract of Fluid/Part. Sep. J. vol. 5 No. 1, pp. 31–36, (1992).

Primary Examiner—Philip Tucker
Attorney, Agent, or Firm—Roy F. House

[57] ABSTRACT

Aphron-containing oil based well drilling and servicing fluids are disclosed which seal microfractures and the like during drilling and well servicing operations, thus decreasing the volume of fluid lost to the formations contacted by the fluids.. The fluids comprise an oleaginous liquid as the continuous phase, a viscosifier which imparts a low shear rate viscosity to the fluids of at least 10,000 centipoise, an aphron-generating surfactant, and aphrons. The fluids are used in a conventional method of drilling an oil and/or gas well or in conventional methods of servicing or treating such wells, such as in completion, workover, sand control, and frac pack operations, and as spotting fluids to release stuck pipes or tools in a wellbore.

14 Claims, No Drawings

APHRON-CONTAINING OIL BASE FLUIDS AND METHOD OF DRILLING A WELL THEREWITH The patent application is a continuation-in-part application of U.S. patent application Ser. No. 08/800,727 filed Feb. 13, 1997 now U.S. Pat. No. 5,881,826, and a continuation P.C.T. International Application No. PCT/US98/02566 filed Feb. 10, 1998, to each of which priority is claimed herein.

BACKGROUND OF THE INVENTION

There are disclosed in co-pending patent application Ser. No. 08/800,727 filed Feb. 13, 1997, incorporated herein by reference, and co-pending PCT patent application Ser. No. PCT/US98/02566 filed Feb. 10, 1998, incorporated herein by reference, aqueous well drilling and servicing fluids which exhibit a high low shear rate viscosity (hereinafter often referred to as "LSRV") and which contain aphrons (i.e., microbubbles of a gas). The preferred fluids have the aphrons generated by imbibing air contacted by the fluids and creating the aphrons due to the pressure drop and cavitation which occurs when the flowing fluid exits the drill bit. However inert gases such as nitrogen and carbon dioxide can be incorporated into the fluids rather than relying on imbibed air or can be generated in-situ by reactive components such as carbonates and acids. Moreover, the aphrons can be generated at the surface of the well and incorporated into the fluid or the aphrons can be created at the surface in the fluid.

This invention relates to aphron-containing well drilling and servicing fluids wherein the fluids have an oleaginous liquid continuous phase.

Horizontal wells drilled and completed in unconsolidated sand reservoirs have become feasible recently, due to new technology and completion methods. Wells of this type require sand control, for example such as long open hole gravel packs or the installation of mechanical sand exclusion devices (slotted liners, prepacked screens, etc.). Successful wells have been completed with horizontal techniques, producing intervals as long as 1800 ft (550 m) and more using these methods of sand control.

Usually the wells are drilled with conventional drilling muds to the top of the pay zone and casing is set. The cement is then drilled out to the casing shoe and the shoe is tested. The drilling mud is then displaced with a "low damage potential drilling fluid" generally consisting of polymers, viscosity enhancers and particles for building a filter cake. The particles are usually graded salt (NaCl) or graded calcium carbonate ($CaCO_2$). These compounds are used because they are soluble in undersaturated brines or hydrochloric acid.

After the open hole interval has been drilled to total depth, the gravel pack screen or sand exclusion device is placed in the open hole interval. To do this it becomes necessary to circulate the drilling fluid from the open hole so that the well can be gravel packed or the sand exclusion setting can be tested. Displacement of the drilling fluid with a solids-free completion brine is necessary. Concern about the physical erosion of the filter cake with the completion fluid is also always an issue. That is, the filter cake should be durable and stable enough to permit the completion or other operation to take place and protect the well bore during the entire operation.

Drilling of microfractured shales, microfractured and vugular carbonate and dolomite formations requires a drilling fluid which will seal these formations preventing the loss of gross amounts of fluids to the formations.

The ideal drilling mud or drill-in fluid would mechanically seal all pore openings, microfractures, and the like exposed to the wellbore, stay intact during completion operations, then be easily removed by production of oil or gas. Problems arise in designing these fluids or muds because production zones vary in pressure, permeability, porosity and formation configuration. It would be desirable if fluids could be devised which would prevent the loss of expensive completion fluids to the formations and which effectively protects the original permeable formation during various completion operations such as gravel packing or well bore workovers.

Oil muds and invert emulsion (oil base) drilling fluids have found application where the use of water-based fluids would result in damage to the formation through which the drilling is progressing. For example, it is known that certain types of shale will heave and collapse if water-based drilling fluids are used. Since the oil-based drilling fluids do not result in any swelling of the shale, their use circumvents the heaving problem. Invert emulsion muds basically contain an oleaginous medium, such as hydrocarbon liquid as the continuous phase, water as the dispersed phase, various emulsifying agents, wetting agents, weighting agents and viscosifiers, such as amine treated clays.

One of the disadvantages of oil base muds is their tendency to promote lost circulation during drilling as compared to water base muds of the same density.

SUMMARY OF THE INVENTION

We have now determined that oil base fluids (muds) containing aphrons significantly decrease lost circulation problems when used to drill a well. Such oil base fluids comprise an oleaginous continuous phase, one or more viscosifiers that impart an elevated low shear rate viscosity to the fluid of at least 10,000 centipoise, one or more aphron-generating surfactants, and aphrons.

Thus, it is an object of the invention to incorporate aphrons into oil base well drilling and servicing fluids to improve the performance thereof.

It is another object of the invention to prepare oil base well drilling and servicing fluids having a low shear rate viscosity of at least about 10,000 centipoise and containing aphrons therein.

It is still another object of the invention to provide a method of drilling a well wherein the novel drilling fluid of this invention is used as the re-circulateable drilling fluid.

These and other objects of the invention will be apparent to one skilled in the art upon reading the specification and claims hereof While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

In its broadest aspects, the present invention is directed to the incorporation of aphrons into oil base well drilling and servicing fluids (hereinafter sometimes referred to as "OBWDAS" fluids). The OBWDAS fluid may be any such fluid known in the art such as those marketed by such well known companies as: Baroid (INVERMUL™, PETROFREE™, ENVIROMUL™, BAROID 100™, etc.); Baker Hughes (CARBO-MUL™, CARBO-DRILL™, CARBO-TEC™, CARBO-FAST™, CARBO-CORE™, SYN-TEQ™, etc.); M-I (NOVADRIL™, NOVAPLUS™, NOVALITE™, etc.); Dowell Schlumberger (ULTADRILL™, etc.); and others. In accordance with this invention, the LSRV of the OBWDAS fluid is first increased to at least 10,000 cp, preferably at least 20,000 cp, and most preferably at least about 40,000 cp by incorporating a compatible viscosifier therein. Thereafter a compatible aphron-generating surfactant is incorporated in the fluid, and aphrons generated therein.

The OBWDAS fluids of this invention comprise a oleaginous continuous phase, a viscosifier soulblized or dispersed therein to increase the LSRV of the fluid to at least 10,000 cp, preferably at least 20,000 cp, and most preferably to at least 40,000 cp, an aphron-generating surfactant, and aphrons. Optionally the OBWDAS fluids may contain water as a dispersed phase, various emulsifying agents, wetting agents, weighting agents, fluid loss control agents, water soluble salts, and the like as is known in the art.

The base oleaginous phase may be any organic, water-insoluble liquid which can be viscosified to the desired extent. Exemplary oleaginous liquids known in the art include petroleum oils or fractions thereof, vegetable oils, and various synthetic organic liquids such as oligomers of unsaturated hydrocarbons, carboxylic acid esters, phosphoric acid esters, ethers, polyalkleneglycols, diglymes, acetals, and the like.

The oleaginous liquid can be viscosified with various materials such as organophilic clays, colloidal fumed silicas, resins, polymers, dimer acids, fatty amine salts of anionic polysaccharides, fatty acid salts of cationic polysaccharides, oil-dispersible/soluble latex-type products, and mixtures thereof as is known in the art.

The organophilic clays useful as viscosifiers to increase the LSRV of the oleaginous fluids of this invention are well known in the art. They comprise reaction products or organic onium compounds with naturally occurring or synthetic clays. The clay portion of the organophilic clay gellants are crystalline, complex inorganic silicates, the exact composition of which cannot be precisely defined since they vary widely from one natural source to another. However, these clays can be described as complex, inorganic silicates, such as alumininum silicates and magnesium silicates, containing, in addition to the complex silicate lattice, varying amounts of cation-exchangeable ions, such as calcium, magnesium, and sodium. Hydrophilic clays which are preferred in this invention are the water-swelling smectite clays, such as montmorillonite, hectorite, saponite and particularly bentonite clay from Wyoming which contains exchangeable sodium ions. Attapulgite clay and sepiolite clay can also be used as the clay portion of the organophilic clay. The clays may be used in the impure form as such or may be purified by centrifuging an aqueous slurry of the clay.

The organic onium compounds reacted with the smectite clays are desirably acidic salts of primary, secondary and tertiary amines, preferably quaternary ammonium compounds. The onium compounds should contain at least one alkyl, alkylene or alkylidiene radical having at least ten carbon atoms, preferably about 16 to 22 carbon atoms. Typical quaternary ammonium compounds are dimethyl dihydrogenated tallow ammonium chloride, trimethyl hydrogenated tallow ammonium chloride, dimethyl benzyl octadecyl ammonium chloride and methyl benzyl dioctodecyl ammonium chloride. A typical acid salt of an amine is the acid salt of cocoamine. Other organic onimum compounds, such as organic phosphonium compounds, can be used. Organic modified clays and their preparation are more fully described in U.S. Pat. Nos. 2,531,427; 2,531,812; 2,966,506; 3,929,849; 4,287,086; 4,105,578, all of which are herein incorporated by reference.

The preferred organophilic clays for use in the drilling fluids of the present invention are dimethyldihydrogenated tallow ammonium bentonite, dimethylbenzyl-hydrogenated tallow ammonium bentonite, and methylbenzyldihydrogenated tallow ammonium bentonite.

Schumate et al. U.S. Pat. No. 5,021,170, incorporated herein by reference, discloses that a sulfonated, ethylene/propylene/5-phenyl-2-norborene terpolymer (EPDM polymer) and an organophilic clay viscosifier synergistically increase the viscosity and suspension characteristics of invert emulsion drilling fluids, particularly such fluids which have a low aromatic content hydrocarbon as the oleaginous liquid phase. The EPDM polymer is generally described in U.S. Pat. No. 4,442,011, incorporated herein by reference.

Basically, the EPDM polymers have about 5 to about 30 milliequivalents of sulfonate group per hundred grams of the sulfonated polymer, wherein the sulfonated group is neutralized with a metallic cation or an amine or ammonium counterion. The EPDM polymers have about 0.5 to about 20% by weight phenyl norbornene, or preferably about 1 to about 10%, most preferably about 2 to about 8%. The preferred polymers contain about 10 to about 80% by weight ethylene and about I to about 10% by weight of 5-phenyl-2-nobornene monomer, the balance of the polymer being propylene. Preferably, the polymer contains from about 30 to about 70% by weight ethylene, e.g., 50 weight percent, and 2 to about 8% phenyl-2-norborene monomer, e.g., 5.0 weight percent.

A typical ethylene/propylene/5-phenyl-2-norborene terpolymer has a Mooney viscosity (ML, 1+8, 212° F.) of about 16 and has an ethylene content of about 50 weight percent and a 5-phenyl-2-norbornene content of about 5 weight percent.

The terpolymers have a number average molecular weight (Mn), as measured by Gel Permeation Chromatograph (GPC), of about 5,000 to about 300,000, more preferably of about 10,000 to about 80,000. The Mooney viscosity of the terpolymer is about 5 to about 90, more preferably about 10 to about 80, most preferably about 15 to about 50.

The gelling agent comprised of the terpolymer and the clay will generally be present in the drilling fluid in an amount of from about 0.5 pounds to about 10 pounds per 42 gallon barrel (ppb) of fluid.

Oehler et al. U.S. Pat. No. 4,816,551, incorporated herein by reference, discloses that certain amide resins provide more shear thinning fluids with improved thixotropy in fluids containing an organophilic clay viscosifier, particularly in low viscosity mineral oils. The amide resins are the reaction products of a dibasic dimerized or trimerized fatty acid, a dialkanolamine, and a dialkylenepolyamine.

Dibasic acids may be the dimerized fatty acids, commercial products prepared by dimerization of unsaturated fatty acids containing at least 8, preferably about 10 or more to about 18 carbon atoms, including 9-dodecanoic(cis), 9-tetradodecanoic(cis), 9-octadecanoic(cis), octadecatetranoic acids, and the like. The typical molecule would contain two carboxyl groups and about 36 carbon atoms in a branched chain configuration. The dibasic trimerized fatty acid may be used which is also a commercial material and similarly prepared, containing about 54 carbon atoms, if at least one of the carboxyl groups is blocked or made inactive by being in the form of an ester group, a salt and the like, i.e., the trimerized fatty acid as used in this invention is a dibasic acid. Mixtures of dimerized acids and trimerized acids may be used.

The dialkanolamines include hydroxyalkylamines, for example, materials wherein the alkanol groups contain 1 to 6 carbon atoms, preferably 2 to 4 carbon atoms; including for example diethanol amine, di-n-propanol amine, di-isopropanol amine, dibutanol amine, dipentanolamine, dihexanol amine, and the like, and combinations thereof. Preferred are diethanol amine and dipropanol amine. Alkyl hydroxyalkylamines including ethylhydroxyethyl amine, propylhydroxyethyl amine, butylhydroxypropyl amine, and the like can also be used.

The polyalkylene polyamines include materials wherein the alkylene groups contain about 1 to 6 carbon atoms, preferably 2 to 4 carbon atoms: "poly" refers to an integer from about 2 to 20, and at least 3 nitrogen atoms. These materials may be represented by the general formula

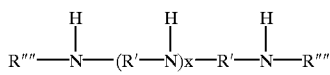

wherein R' is an alkylene group containing 1 to 6 carbon atoms, R"" is hydrogen or an alkyl group containing 1 to 6 carbon atoms, an x is an integer from 1 to 20. Typical useful materials include diethylene triamine, triethylene tetraamine, tetramethylene pentaamine, polyamine HH, polyamine HPA, and the like. Preferred are diethylene triamine and triethylene tetraamine. The products may be represented by the general formula

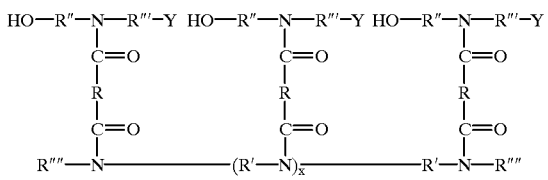

wherein R is an alkylene group containing 20, preferably about 30 to 54 carbon atoms; R' is an alkylene group containing 1 to 6 carbon atoms, R" is an alkylene group containing 1 to 6 carbon atoms, R'" is an alkylene group containing 1 to 6 carbon atoms, R"" is a direct bridge, covalent bond, between N and Y or is a hydrogen or alkyl radical containing 1 to 6 carbon atoms, Y is hydrogen or hydroxy, and x is an integer from 1 to 20.

Cooperman et al. U.S. Pat. No. 5,710,110, incorporated herein by reference, discloses that 0.01 to about 5% by weight of certain amine additive reaction products in combination with one or more Theologically active clay-based materials provide improved anti-settling properties for both oil and invert oil emulsion based drilling fluids. Such Theologically active clay-based materials include organoclays, smectite-type clays including Wyoming bentonite, beneficiated sodium and calcium bentonite and hectorite, and attapulgite clay. Organoclays and method of making them are described, for example, in U.S. Pat. Nos. 5,075,033, 5,130,028, and 5,151,155. Smectite-type clays are cation-exchangeable clays described at length and by chemical formula in U.S. Pat. No. 5,350,562. Bentonite, a particularly useful clay for this invention, is described at length in Carr. Industrial Minerals and Rocks. $6^{th}$ Edition (1994) in a chapter entitled *Bentonite*, authored by Drs. Elzea and Murray of Indiana University. Attapulgite clays are well known natural clays which possess cation exchange capacity but of a lower amount than smectite-type clays such as bentonite and hectorite.

The amine additive reaction products comprise one or more reaction products of one or more polyalkoxylated aliphatic amino compounds having a chemical structure represented by the following formula:

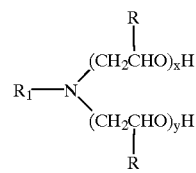

wherein $R_1$ is a straight chain alkyl group derived from fatty sources having 12 to 18 carbon atoms, R is selected from the group consisting of hydrogen, methyl and ethyl, both x and y are at least 1, and the sum of x+y is from 2 to 15 and one or more organic compounds selected from the group consisting of maleic anhydride, phthalic anhydride and mixtures thereof.

An increase in anti-settling properties is achieved from this mixture combination within broad ranges of amines to Theologically active clay. Alternative ways of preparing a drilling fluid according to this invention are to add such cation exchangeable clay-based material to the drilling fluid separately from the above mentioned amine reaction products, to add the amine additive to the drilling fluid when the fluid is being used to drill through domains containing Theologically active clays, or to add the amine alone if the drilling fluid already contains such clay-based materials.

Exemplary polymers useful as viscosifiers in the fluid of this invention are set forth in the following references.

Peiffer et al. U.S. Statutory Invention Registration No. H837, incorporated herein by reference, discloses the use of a water insoluble, hydrocarbon soluble polymeric complex formed from a sulfonated (anionic) polymer and a water insoluble vinyl pyridine (cationic) polymer as a viscosifier for oil-based drilling muds.

Peiffer et al. U.S. Pat. No. 4,978,461, incorporated herein by reference, discloses the use of a thermoplastic terpolymer of p-methylstyrene/metal neutralized styrene sulfonate/styrene as viscosification agents for oil-based drilling muds.

Patel et al. U.S. Pat. No. 4,740,319, incorporated herein by reference, discloses the use of latices comprising a polymer which is the reaction product of a first monomer selected from the group consisting of styrene, butadiene, isoprene, and mixtures thereof and a second functional monomer which contains a radical selected from the group consisting of amide, amine, sulfonate, carboxylic acid, dicarboxylic acid, and combinations thereof, provided that at least one of the functional monomers is a nitrogen containing material selected from the group consisting of amides and amines.

Turner et al. U.S. Pat. No. 4,425,461, incorporated herein by reference, discloses the use of a mixture of a water insoluble neutralized sulfonated thermoplastic polymer and a water insoluble neutralized sulfonated elastomeric polymer as viscosification agents for oil-based drilling muds.

Commercially available polymers include HYBILD™ 201 (BP Chemicals), HYVIS™ (Unocal), and others.

The aphron generating surfactant for use in the fluids of this invention must be compatible with the base liquid and the viscosifier therein such that the LSRV of the fluid can be maintained. The surfactant may also have one or more stabilizers incorporated therein, such as alkyl alcohols, fatty alkanolamides, and allyl betaines. Generally the alkyl chain will contain from about 10 to about 18 carbon atoms. The aphron-generating surfactant may be anionic, non-ionic, or cationic depending on compatibility with the viscosifier.

The fluorosurfactants include, but are not limited to, (i) fluorinated telomers, (ii) amphoteric fluorosufactants, (iii) polyfluorinated amine oxide, (iv) fluoroalkyl ethylthio polyacrylamides, (v) perfluoroalkyl ethylthiopolyacrylamides, (vi) derivatives of 1-propanaminium, 2-Hydroxy-N,N,N-trimethyl-3-gamma-omega-perfluoro-($C_6$–$C_{20}$-alkyl) thio, chloride, (vii) fluoroalkyl sodium sulfonate, and (viii) sodium salts of 1-propanesulfonic acid, 2-methyl-, 2-{[1-oxo-3[gamma,-omega, -perfluoro-$C_{16}$–$C_{26}$-alkyl) thio} propyl} amino} derivative.

A particularly preferred fluorosurfactant is a mixture of fluoroaliphatic polymeric esters sold by 3M Company under the tradename FLUORAD™ FC 740.

D'Arrigo U.S. Pat. No. 4,684,479, incorporated herein by reference, discloses surfactant mixtures comprising (a) a member selected from the group consisting of glycerol monoesters of saturated carboxylic acids containing from about 10 to about 18 carbon atoms and aliphatic alcohols containing from about 10 to about 18 carbon atoms; (b) a sterol-aromatic acid ester; (c) a member selected from the group consisting of sterols, terpenes, bile acids and alkali metal salts of bile acids; (d) a member selected from the group consisting of sterol esters of aliphatic acids containing from 1 to about 18 carbon atoms; sterol esters of sugar acids; esters of sugar acids and aliphatic alcohols containing from about 10 to about 18 carbon atoms; esters of sugars and aliphatic acids containing from about 10 to about 18 carbon atoms; sugar acids; saponins; and sapogenins; and (e) a member selected from the group consisting of glycerol, glycerol di- or triesters of aliphatic acids containing from about 10 to about 18 carbon atoms and aliphatic alcohols containing from about 10 to about 18 carbon atoms; said components being present in said mixture in a weight ratio a:b:c:d:e of 2-4:0.5-1.5:0.5-1.5:0-1.5:0-1.5.

The incorporation of aphrons into water base well drilling and servicing fluids is disclosed in copending patent application U.S. Ser. No. 08/800,727 filed Feb. 13, 1997 now U.S. Pat. No. 5,881,826, and PCT International Application No. PCT/US98/02566 filed Feb. 10, 1998, each incorporated herein by reference.

As indicated, in its broadest aspects, the present invention is directed to the incorporation of aphrons into oil base well drilling and servicing fluids. The base fluid may be a fluid known in the art as exemplified by the patents and fluids set forth hereinbefore, or it may be a freshly prepared fluid having the characteristics desired. Stable aphron-containing spotting fluids are obtained by increasing the low shear rate viscosity (LSRV) of the fluid to at least 10,000 centipoise, preferably at least 20,000 centipoise, and most preferably to at least 40,000 centipoise. Since the stability of the aphrons is enhanced as the LSRV increases, a LSRV of several hundred thousand may be desired. We have found that those viscosifiers which provide the elevated LSRV required of the present invention have the unique property of delaying coalescence of the aphrons for extremely long periods of time.

The aphrons are obtained by incorporating (1) an aphron-generating surfactant into the fluid and thereafter generating the aphrons in the fluid or (2) generating the aphrons in a liquid compatible with the fluid and mixing the aphron-containing fluid with the fluid.

The book by Felix Sebba entitled "Foams and Biliquid Foams—Aphrons", John Wiley & Sons, 1987, incorporated herein by reference, is an excellent source on the preparation and properties of aphrons, i.e., microbubbles, in aqueous systems. An aphron is made up of a core which is often spherical of an internal phase, usually gas, encapsulated in a thin shell. This shell contains surfactant molecules so positioned that they produce an effective barrier against coalescence with adjacent aphrons.

The aphrons can be generated by means known in the art. In addition to the methods disclosed by Felix Sebba in his book referenced previously, methods are disclosed in Michelsen et al. U.S. Pat. No. 5,314,644, incorporated herein by reference, Yoon et al. U.S. Pat. No. 5,397,001, incorporated herein by reference, Kolaini U.S. Pat. No. 5,783,118, incorporated hereby by reference, Wheatley et al. U.S. Pat. No. 5,352,436, incorporated herein by reference, and U.S. Pat. Nos. 4,162,970; 4,112,025; 4,717,515; 4,304,740; and 3,671,022, each incorporated herein by reference.

Aphrons will be produced by the pressure drop and cavitation as the fluid is pumped through the drill bit.

The gas used to create the aphrons may be any gas which is not appreciably soluble in the oleaginous phase of the fluid. Thus the gas may be air, nitrogen, carbon dioxide, and the like, including air encapsulated in the fluid during mixing.

None of the prior art disclose the use of aphrons (or microbubbles) in systems under elevated pressures as in the present use. It is well known that the hydrostatic pressure of the fluid in a borehole increases as the depth increases. Thus although the size of the microbubbles is compressed, the elevated LSRV is believed to keep the aphrons from coalescing. In this regard, the aphrons can have a larger size at the surface of the well, as long as they are individual bubbles, since they will decrease in size to the aphron size range of less than about 100 micrometers as they are pumped down the borehole.

The fluid may contain more than one liquid such as a liquid dispersed or emulsified into the base oleaginous liquid in which it is relatively insoluble, such as water-in-oil dispersions or emulsions, and the like, where the "water" phase is an aqueous liquid or water soluble liquid and where the "oil" phase is a water insoluble liquid.

The aqueous liquid may be fresh water, sea water, or a brine containing soluble salts such as sodium chloride, potassium chloride, calcium chloride, magnesium chloride, sodium bromide, potassium bromide, calcium bromide, zinc bromide, sodium formate, potassium formate, cesium formate, and mixtures thereof The brine may contain one or more soluble salts at any desired concentration up to saturation. Indeed, super saturated brines can be utilized where a solids free fluid is not desired or required.

The concentration of aphron-generating surfactant or surfactant mixture required is generally from 1 ppb to about 20 ppb, preferably from about 1 ppb to about 15 ppb. An indication of the volume of aphrons generated can be obtained by determining the density reduction which occurs upon generating the aphrons in the fluid. Foaming of the fluid, which is undesirable, can occur if the concentration of aphron-generating surfactant is excessive. We have determined that the concentration of surfactant can be increased, without any adverse effect on the fluid, as the LSRV increases. Thus the concentration of aphron-generating surfactant, which can be determined by routine testing, is the amount required to generate sufficient aphrons to give the density reduction desired but which is, preferably, insufficient to create a long-lasting foam on he surface of the fluid.

The concentration of aphrons in the fluid is preferably from about 5% by volume to about 20%, most preferably from about 5% to about 15% by volume.

The density of the fluids can be adjusted, as required, by the addition of weight materials or the addition of soluble salts to the fluids as is well known in the art. Preferably the weight material is added to the fluid before generation or incorporation of aphrons therein, thus adjusting the final density of the aphron-containing fluid to the desired density by the concentration of aphrons therein.

As indicated, the concentration of aphrons in the fluid should be less than about 20% by volume at atmospheric pressure. However, on circulation of the fluid in a borehole, the volume of the aphrons is believed to decrease as the hydrostatic pressure of the fluid increases. Indeed the aphrons may compress in size to almost no volume depending on the depth of the borehole. The measured density under pressure should be very close to the density of the fluid without any aphrons. The aphrons do not disappear, however. They are still present, and additional aphrons will be generated at the face of the bit due to the pressure drop and cavitation. The aphrons are extremely small, have very high surface area, and are highly energized.

As soon as the fluid exits the bit and starts back up the annulus, some pressure drop begins to occur and the aphrons will begin to expand. As the fluid moves up the borehole and it encounters a loss to the formation, the aphrons are filtered into the pore throats, microfractures, or other types of loss zone. These loss zones are areas where pressure drops occur. The aphrons in these loss zones then expand and aggregate and hence seal the loss zones. The "% aphrons by volume" in these micro environments is highly variable and will depend on the specific pressure and pressure drop within the loss zones. Thus it is believed that the micro environment density is completely different than the density of the fluid in the borehole.

The density reduction at atmospheric pressure which occurs on entraining up to 20% by volume of a gas in the fluids of the invention is sufficient to provide the quantity of aphrons needed in the borehole while allowing the fluid to be recirculatable without causing pump problems.

Additionally, the fluid may contain other functional materials known in the art such as emulsifiers, wetting agents, and the like.

Without being limited hereby, it is believed that the aphrons present in the fluid effectively seal the formation during drilling or well servicing operations thus preventing the excessive loss of fluid to the formations being drilled or serviced.

The fluids of this invention can be used in conventional drilling and well servicing operations as conducted in the art. Thus in drilling an oil and/or gas well the fluid is circulated from the surface down the drill pipe, coiled tubing, or the like through the bit and up the annulus between the drill pipe and the sides of the borehole back to the surface. The aphrons in the fluid seal the borehole surface preventing the loss of excessive amounts of fluid to the formations being drilled.

It is preferred that the aphron-containing fluid of the present invention be utilized in a drilling process wherein the drill bit is a cavitating liquid jet assisted drill bit. Exemplary cavitating liquid jet assisted drill bits are set forth in Johnson, Jr. et al. U.S. Pat. No. 4,262,757, incorporated herein by reference, and Johnson, Jr. et al. U.S. Pat. No. 4,391,339, incorporated herein by reference. Preferably the cavitating jet nozzle in the cavitating liquid jet assisted drill bit includes a pin received at a central position which lowers the pressure of the pressurized drilling fluid such that cavitation bubbles form in the fluid. See for example Henshaw U.S. Pat. No. 5,086,974, incorporated herein by reference, and Henshaw U.S. Pat. No. 5,217,163, incorporated herein by reference.

Similarly, the fluids of the invention can be used in well servicing operations such as completion operations, workover operations, sand control operations, frac pack operations, and the like. The fluids can be used as spotting fluids to release pipes and tools stuck in the filter cake on the sides of a borehole by differential sticking.

The following examples are presented to demonstrate the invention but should not be construed as limiting the scope of the invention. The aphron-generating surfactants evaluated are as follows: STEOL™ CS-460, sodium laureth sulfate which is 60% active; and FLUORAD™ FC-740, a mixture of fluorinated aliphatic polymeric esters. Abbreviations used in the table or this specification are as follows: cp=centipoise; g=grams; bbl=42 gallon barrel; ppg=pounds per gallon; ppb=pounds per barrel; psi=pounds per square inch; rpm−revolutions per minute; STI=shear thinning index which is the ratio of the 0.5 rpm Brookfield viscosity and the 100 rpm Brookfield viscosity, a measure of the degree of shear thinning of a fluid; vol.=volume; LSRV=low shear rate viscosity measured on a Brookfield Viscometer at 0.5 rpm.

EXAMPLE 1

8.0 grams of CARBO-GEL™ organophilic hectorite were dispersed in 300 g (1 bbl equivalent) of diesel oil with 1 g propylene carbonate dispersant to form a viscous slurry. 2.0 g of STEOL™ CS-460 surfactant were added while mixing in a high speed (shear) blender. Aphrons were incorporated into the viscous fluid from the vortex in the mixer.

EXAMPLE 2

Example 1 was repeated except that 11.0 g of CARBO-GEL™ were used.

The fluids of Examples 1–2 were evaluated for the Brookfield viscosity at 0.5 rpm, which is a measure of the LSRV, and the Brookfield viscosity at 100 rpm. The ratio of the 0.5 rpm viscosity to the 100 rpm viscosity is a measure of the shear thinning characteristics of the fluids. The density of the fluids was also measured and used to calculate the concentration of aphrons in the fluids using the equation:

(Calculated Density−Actual Density)(100)÷(Calculated Density).

The data obtained are set forth in Table A.

TABLE A

| Example | Brookfield Viscosity, cp | | | Density ppg | Calculated Density ppg | Aphrons Vol. % |
| --- | --- | --- | --- | --- | --- | --- |
| | 0.5 rpm | 100 rpm | STI | | | |
| 1 | 47,000 | 369 | 127 | 5.58 | 7.40 | 24.6 |
| 2 | 111,000 | 912 | 122 | 6.51 | 7.47 | 12.9 |

EXAMPLE 3

One barrel equivalent (350 cubic centimeters) of a 12.57 ppg invert oil emulsion drilling fluid having an 80/20 diesel oil/water ratio and containing 5.5 ppb CARBO-GEL™, 1 ppb propylene carbonate, 5 ppb CARBO-TEC™ L, 8 ppb CARBO-MUL™, 3 ppb lime, and 229 ppb barite, wherein the aqueous internal phase is 30% by weight calcium chloride solution, was placed in a high shear lab Osterizer mixer and mixed for 5 minutes after adding 2 ppb of FLUORAD™ FC-740 fluorocarbon surfactant (non-ionic fluoroaliphatic polymeric esters) thereto. The density and Brookfield viscosity were then measured. This fluid, which contained about 9.7% aphrons, was then passed through an APV Gaulin™ homogenizer at 1000 psi and the density and viscosities again determined.

The data obtained are set forth in Table B.

TABLE B

| Fluid | Brookfield Viscosity | | | | Density | Aphrons |
|---|---|---|---|---|---|---|
| Homogenized | 0.3 rpm | 0.5 rpm | 100 rpm | STI | ppg | Vol. % |
| No | 23,000 | 15,200 | 215 | 71 | 11.43 | 9.7 |
| Yes | 74,000 | 48,200 | 490 | 98 | 11.52 | 7.5 |

EXAMPLE 4

8.0 grams of CARBO-GEL™ organoclay viscosifier were dispersed in 295 g (1 bbl equivalent) of MENTOR™ 28 mineral oil with 1 g propylene carbonate to form a viscous slurry. 1 g of CAB-O-SIL™ TS-720 hydrophobic silica followed by 1 g of STEOL™ CS-460 were added, and thereafter 0.55 g of FLUORAD™ FC-740 fluorinated surfactant. This fluid was evaluated as before. The data are given in Table C.

TABLE C

| Brookfield Viscosity, cp | | | Density | Calculated Density | Aphrons Vol. |
|---|---|---|---|---|---|
| 0.5 rpm | 100 rpm | STI | ppg | ppg | % |
| 100,000 | 900 | 111 | 6.07 | 7.02 | 13.5 |

EXAMPLE 5

Wells are drilled in the well known rotary process wherein a drilling fluid having the composition of the fluids set forth in Example 1, Example 2, Example 3, and Example 4 are continuously re-circulated within the wellbore. The aphrons in the fluids seal the porous and microfractured formations contacted by the fluid preventing the excessive loss of fluid into the formations. Thereafter the fluids are used to conduct well servicing operations in the wells.

What is claimed is:

1. A well drilling and servicing fluid comprising an oleaginous liquid as the continuous liquid phase having incorporated therein one or more viscosifiers such that the fluid has a low shear rate viscosity as measured with a Brookfield Viscometer at 0.5 rpm of at least about 10,000 centipoise, at least one aphron-generating surfactant, and aphrons.

2. A recirculatable well drilling and servicing fluid comprising an oleaginous liquid as the continuous liquid phase having incorporated therein one or more viscosifiers such that the fluid has a low shear rate viscosity as measured with a Brookfield Viscometer at 0.5 rpm of at least about 10,000 centipoise, at least one aphron-generating surfactant, and aphrons.

3. The fluid of claim 1 which contains a discontinuous aqueous phase.

4. The fluid of claim 1 which contains from about 5% by volume to about 20% by volume aphrons.

5. The fluid of claim 2 which contains a discontinuous aqueous phase.

6. The fluid of claim 2 which contains from about 5% to about 20% by volume aphrons.

7. The fluid of claim 1, 2, 3, 4, 5, or 6 wherein the low shear rate viscosity is at least about 40,000 centipoise.

8. A method of drilling a well wherein there is circulated within the wellbore the fluid of claim 1, 2, 3, 4, 5, or 6.

9. The method of claim 8 wherein the fluid has a low shear rate viscosity of at least about 40,000 centipoise.

10. A method of conducting well servicing operations in a borehole which comprises using as the borehole fluid the fluid of claim 1, 2, 3, 4, 5, or 6.

11. The method of claim 10 wherein the fluid has a low shear rate viscosity of at least about 40,000 centipoise.

12. The fluid of claim 1, 2, 3, 4, 5, or 6 wherein the low shear rate viscosity is at least about 20,000 centipoise.

13. The method of claim 8 wherein the fluid has a low shear rate viscosity of at least about 20,000 centipose.

14. The method of claim 10 wherein the fluid has a low shear rate viscosity of at least about 20,000 centipose.

* * * * *